(12) United States Patent
Omi

(10) Patent No.: US 12,541,954 B2
(45) Date of Patent: Feb. 3, 2026

(54) IMAGE-FOR-TRAINING SELECTING APPARATUS, IMAGE-FOR-TRAINING SELECTING METHOD, AND STORAGE MEDIUM FOR DECISION MAKING

(71) Applicant: NEC Corporation, Tokyo (JP)

(72) Inventor: Yasuo Omi, Tokyo (JP)

(73) Assignee: NEC Corporation, Tokyo (JP)

( * ) Notice: Subject to any disclaimer, the term of this patent is extended or adjusted under 35 U.S.C. 154(b) by 216 days.

(21) Appl. No.: 18/554,752

(22) PCT Filed: Jan. 20, 2023

(86) PCT No.: PCT/JP2023/001612
§ 371 (c)(1),
(2) Date: Oct. 10, 2023

(87) PCT Pub. No.: WO2024/154316
PCT Pub. Date: Jul. 25, 2024

(65) Prior Publication Data
US 2025/0086943 A1 Mar. 13, 2025

(51) Int. Cl.
*G06V 10/774* (2022.01)
*G06V 10/764* (2022.01)

(52) U.S. Cl.
CPC .......... *G06V 10/774* (2022.01); *G06V 10/764* (2022.01)

(58) Field of Classification Search
CPC .... G06V 10/774; G06V 10/764; G06V 10/82; G06N 20/00

(Continued)

(56) References Cited

U.S. PATENT DOCUMENTS

2020/0341432 A1* 10/2020 Ishibashi ................. G06F 30/27
2022/0367040 A1* 11/2022 Sutherland ............. G16H 40/67
2023/0386191 A1* 11/2023 Zhu ....................... G06V 10/774

FOREIGN PATENT DOCUMENTS

CN 102804208 A * 11/2012 ........... G06V 10/763
CN 113450306 A * 9/2021 ........... G06V 10/778

(Continued)

OTHER PUBLICATIONS

International Search Report for PCT Application No. PCT/JP2023/001612, mailed on Apr. 4, 2023.

(Continued)

*Primary Examiner* — Charlotte M Baker
(74) *Attorney, Agent, or Firm* — Sughrue Mion, PLLC

(57) ABSTRACT

An image-for-training selecting apparatus for suitably selecting an image-for-training for training a machine learning model includes at least one processor executing: a first training process of training, by contrastive learning using an images-for-training set, a first machine learning model including a first layer group; a second training process of training a second machine learning model including the first layer group and a second layer group and employing the first machine learning model as a pre-trained model; a first calculating process of calculating a first similarity between a parameter of the first layer group after training by the first training process but before training by the second training process and a parameter of the first layer group after training by the second training process; and a first determining process of determining, based on the first similarity, whether the images-for-training set includes an inappropriate image-for-training.

10 Claims, 10 Drawing Sheets

(58) Field of Classification Search
USPC .......................................................... 382/159
See application file for complete search history.

(56) References Cited

FOREIGN PATENT DOCUMENTS

| | | | | |
|---|---|---|---|---|
| CN | 114742754 A | * | 7/2022 | ......... G06F 18/2155 |
| JP | 2014-178229 A | | 9/2014 | |
| JP | 2022-129136 A | | 9/2022 | |
| JP | 2022-169009 A | | 11/2022 | |
| WO | 2019/187594 A1 | | 10/2019 | |
| WO | 2020/031243 A1 | | 2/2020 | |
| WO | 2021/235247 A1 | | 11/2021 | |

OTHER PUBLICATIONS

English translation of International Search Report for PCT/JP2023/001612, mailed on Apr. 4, 2023.

* cited by examiner

FIG. 9

| FACILITY | NUMBER OF PIECES OF DATA |
|---|---|
| HOSPITAL A | N1 |
| HOSPITAL B | N2 |
| HOSPITAL C | N3 |
| ⋮ | ⋮ |
| HOSPITAL Z | Nz |

| MODEL OF IMAGE-CAPTURING APPARATUS | NUMBER OF PIECES OF DATA |
|---|---|
| SCANNER A | M1 |
| SCANNER B | M2 |
| SCANNER C | M3 |
| ⋮ | ⋮ |
| SCANNER Z | Mz |

| TYPE OF CELL | NUMBER OF PIECES OF DATA |
|---|---|
| NORMAL EPITHELIAL CELL | L1 |
| SMALL CELL CARCINOMA | L2 |
| ADENOCARCINOMA | L3 |
| ⋮ | ⋮ |
| SQUAMOUS CELL CARCINOMA | Lz |

IMAGE-FOR-TRAINING SELECTING APPARATUS, IMAGE-FOR-TRAINING SELECTING METHOD, AND STORAGE MEDIUM FOR DECISION MAKING

This application is a National Stage Entry of PCT/JP2023/001612 filed on Jan. 20, 2023, the contents of all of which are incorporated herein by reference, in their entirety.

TECHNICAL FIELD

The present invention relates to an image-for-training selecting apparatus, an image-for-training selecting method, and a storage medium for selecting an image-for-training for use in training of a machine learning model.

BACKGROUND ART

There has been disclosed a technique of selecting an image-for-training for use in training of a machine learning model.

Patent Literature 1 discloses a training apparatus including a first training means that executes a first training process of training, by machine learning using training data, a first model that determines a category of given data.

Further, the training apparatus disclosed in Patent Literature 1 selects upper-level training data as first training data and lower-level training data as second training data, from among pieces of training data sorted in ascending order of a difference between a determination result given by the first training means and a correct category set by a user.

The training apparatus disclosed in Patent Literature 1 further includes a second training means that executes a second training process of learning, by machine learning using the first training data and the second training data, a second learning model that evaluates the training data.

CITATION LIST

Patent Literature

Patent Literature 1

International Publication No. WO 2019/187594

SUMMARY OF INVENTION

Technical Problem

However, if the correct category is incorrect, the training apparatus disclosed in Patent Literature 1 cannot appropriately select training data, disadvantageously. The correct category is set by the user, and, in some cases, the user may set a correct category which is incorrect. Further, in a case where setting of a correct category depends on the skill of a person who sets the correct category, e.g., in a case of using pathological cells, the correct category is not always set correctly.

Further, in machine learning, it is preferable that training data be balanced and be comprehensive. However, in a case where imbalance is present in training data, the training apparatus disclosed in Patent Literature 1 cannot select inappropriate training data.

An example aspect of the present invention was made in consideration of the above problem. An example object of the present invention is to provide a technique for suitably selecting an image-for-training for use in training of a machine learning model.

Solution to Problem

An image-for-training selecting apparatus in accordance with an example aspect of the present invention: includes at least one processor, the at least one processor executing: a first training process of training, by contrastive learning, a first machine learning model including a first layer group which receives input of an image and generates features of the image, the contrastive learning using a set of images-for-training, which is a plurality of images-for-training; a second training process of training, with use of the set of images-for-training, a second machine learning model (i) including the first layer group and a second layer group which is connected to the first layer group and which receives input of the features of an image and classifies the image and (ii) employing the first machine learning model as a pre-trained model; a first calculating process of calculating a first similarity, which is a similarity between (i) a parameter of the first layer group after training by the first training process but before training by the second training process and (ii) a parameter of the first layer group after training by the second training process; and a first determining process of determining, on a basis of the first similarity, whether or not the set of images-for-training includes an inappropriate image-for-training.

An image-for-training selecting method in accordance with an example aspect of the present invention includes at least one processor carrying out: training, by contrastive learning, a first machine learning model including a first layer group which receives input of an image and generates features of the image, the contrastive learning using a set of images-for-training, which is a plurality of images-for-training; training, with use of the set of images-for-training, a second machine learning model (i) including the first layer group and a second layer group which is connected to the first layer group and which receives input of the features of the image and classifies the image and (ii) employing the first machine learning model as a pre-trained model; calculating a first similarity, which is a similarity between (i) a parameter of the first layer group after training by the contrastive learning but before training of the second machine learning model and (ii) a parameter of the first layer group after training of the second machine learning model; and determining, on a basis of the first similarity, whether or not the set of images-for-training includes an inappropriate image-for-training.

A non-transitory storage medium in accordance with an example aspect of the present invention is a non-transitory storage medium containing a program for causing a computer to function as an image-for-training selecting apparatus, the program causing the computer to execute: a first training process of training, by contrastive learning, a first machine learning model including a first layer group which receives input of an image and generates features of the image, the contrastive learning using a set of images-for-training, which is a plurality of images-for-training; a second training process of training, with use of the set of images-for-training, a second machine learning model (i) including the first layer group and a second layer group which is connected to the first layer group and which receives input of the features of the image and classifies the image and (ii) employing the first machine learning model as a pre-trained model; a first calculating process of calculating a first similarity, which is a similarity between (i) a parameter of the first layer group after training by the first training process but before training by the second training process and (ii) a parameter of the first layer group after training by the second training process; and a first determining process of determining, on a basis of the first similarity, whether or not the set of images-for-training includes an inappropriate image-for-training.

Advantageous Effects of Invention

In accordance with an example aspect of the present invention, it is possible to suitably select an image-for-training for use in training of a machine learning model.

BRIEF DESCRIPTION OF DRAWINGS

FIG. 9 is a view illustrating attributes of a plurality of images-for-training in the third example embodiment of the present invention.

DESCRIPTION OF EMBODIMENTS

First Example Embodiment

The following description will discuss a first example embodiment of the present invention in detail with reference to the drawings. The present example embodiment is a basic form of example embodiments described later.
(Configuration of Image-for-Training Selecting Apparatus 1)

An image-for-training selecting apparatus 1 in accordance with the example embodiment is an apparatus that selects an image-for-training for use in training of a machine learning model. For example, the image-for-training selecting apparatus 1 determines whether or not a set of images-for-training, which is a plurality of images-for-training, includes an inappropriate image-for-training, thereby selecting an image-for-training. Examples of the inappropriate image-for-training include an image-for-training having an incorrect training label. Further, examples of the case where the set of images-for-training includes an inappropriate image-for-training also include a case where imbalance is present in the plurality of images-for-training included in the set of images-for-training.

Figure 1:
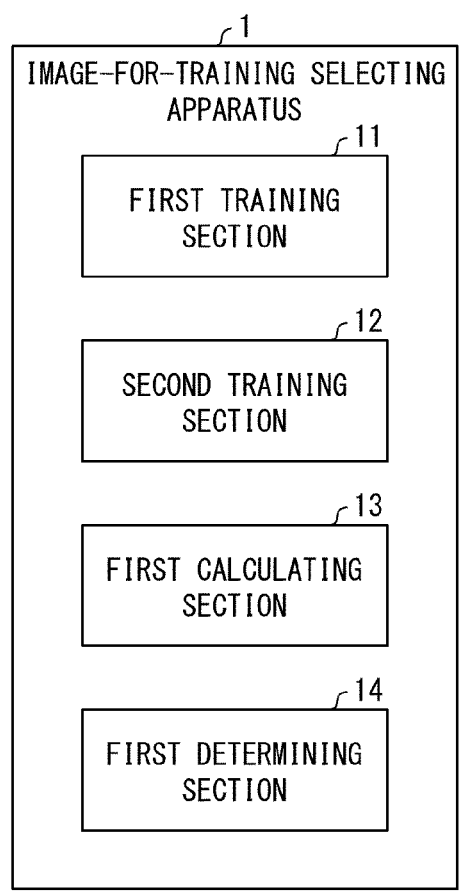
FIG. 1 is a block diagram illustrating a configuration of an image-for-training selecting apparatus in accordance with a first example embodiment of the present invention.

The following will describe, with reference to FIG. 1, a configuration of the image-for-training selecting apparatus 1 in accordance with the present example embodiment. FIG. 1 is a block diagram illustrating a configuration of the image-for-training selecting apparatus 1 in accordance with the present example embodiment.

As shown in FIG. 1, the image-for-training selecting apparatus 1 includes a first training section 11, a second training section 12, a first calculating section 13, and a first determining section 14. In the present example embodiment, the first training section 11, the second training section 12, the first calculating section 13, and the first determining section 14 are configurations respectively realizing a first training means, a second training means, a first calculating means, and a first determining means.

The first training section 11 trains, by contrastive learning, a first machine learning model including a first layer group which receives input of an image and generates features of the image, the contrastive learning using a set of images-for-training, which is a plurality of images-for-training.

The contrastive learning refers to a method according to which: one image of interest (anchor) is selected from among a plurality of images-for-training; and a machine learning model is trained so that (i) an inner product of feature vectors of the image of interest and a positive example (an image-for-training classified into the same category as that of the image of interest, and an image obtained by carrying out desired image augmentation on the image of interest) becomes large and (ii) an inner product of the image of interest and a negative example (an image-for-training classified into a category different from that of the image of interest) becomes small.

The first machine learning model includes an encoder (feature extraction model) that is the first layer group which receives input of an input image and generates features of the input image. Further, the first machine learning model is employed as a pre-trained model of the later-described second machine learning model.

The second training section 12 trains, with use of a set of images-for-training, the second machine learning model (i) including the first layer group and a second layer group which is connected to the first layer group and which receives input of the features of the image and classifies the image and (ii) employing, as a pre-trained model, the first machine learning model having been trained by the first training section 11.

The second machine learning model is constituted by the first layer group (encoder), which is included in the first machine learning model, and the second layer group (classifier) connected to the first layer group. The second training section 12 mainly trains the classifier part. Not only this, the second training section 12 also trains the encoder part for minute adjustment.

The second training section 12 can train the first machine learning model and second machine learning model by a known method. For example, the second training section 12 carries out minute adjustment of the first machine learning model and trains the second machine learning model in the following manner. That is, by using a cross entropy loss as a loss function, the second training section 12 carries out training so as to minimize an error between an output from the machine learning model and correct data.

The first calculating section 13 calculates a first similarity, which is a similarity between (i) a parameter of the first layer group (encoder, feature extraction model) after training by the first training section 11 but before training by the second training section 12 and (ii) a parameter of the first layer group (encoder, feature extraction model) after training by the second training section 12.

Hereinafter, the parameter of the first layer group (encoder, feature extraction model) after training of the first machine learning model by the first training section 11 but before training by the second training section 12 may also be called a "first parameter". The parameter of the first layer group (encoder, feature extraction model) of the second machine learning model after training by the second training section 12 may also be called a "second parameter".

That is, the first calculating section 13 calculates a first similarity, which is a similarity between the first parameter and the second parameter. The first calculating section 13 supplies the first similarity thus calculated to the first determining section 14.

The first determining section 14 determines, on the basis of the first similarity calculated by the first calculating section 13, whether or not the set of images-for-training includes an inappropriate image-for-training.

For example, if the first parameter and the second parameter are similar to each other, the first determining section 14 determines that the set of images-for-training does not include an inappropriate image-for-training. In this case, if the first similarity is equal to or more than a threshold, the first determining section 14 determines that the set of images-for-training does not include an inappropriate image-for-training. Meanwhile, if the first similarity is less than the threshold, the first determining section 14 determines that the set of images-for-training includes an inappropriate image-for-training.

As described above, the image-for-training selecting apparatus 1 in accordance with the present example embodiment includes: the first training section 11 that trains, by contrastive learning, the first machine learning model including the first layer group which receives input of an image and generates features of the image, the contrastive learning using the set of images-for-training, which is the plurality of images-for-training; the second training section 12 that trains, with use of the set of images-for-training, the second machine learning model (i) including the first layer group and the second layer group which is connected to the first layer group and which receives input of the features of the image and classifies the image and (ii) employing the first machine learning model as a pre-trained model the first calculating section 13 that calculates a first similarity, which is a similarity between a parameter of the first layer group after training by the first training section 11 but before training by the second training section 12 and a parameter of the first layer group after training by the second training section 12; and the first determining section 14 that determines, on the basis of the first similarity calculated by the first calculating section 13, whether or not the set of images-for-training includes an inappropriate image-for-training.

With such a configuration, given that the first machine learning model is trained so as to be capable of extracting features having high invariance, the first similarity becomes high. Meanwhile, given that the first machine learning model is not trained so as to be capable of extracting features having high invariance, the first similarity becomes low. For example, in a case where the set of images-for-training includes an image-for-training having an inappropriate training label or in a case where imbalance is present in the plurality of images-for-training included in the set of images-for-training, the first machine learning model would not be trained so as to be capable of extracting features having high invariance, and accordingly the first similarity becomes low.

The image-for-training selecting apparatus 1 in accordance with the present example embodiment determines, on the basis of the first similarity, whether or not the set of images-for-training includes an inappropriate image-for-training. Thus, if the first similarity is high, the image-for-training selecting apparatus 1 in accordance with the present example embodiment can determine that the first machine learning model has been trained so as to be capable of extracting features having high invariance and that the set of images-for-training does not include an inappropriate image-for-training.

Meanwhile, if the first similarity is low, the image-for-training selecting apparatus 1 in accordance with the present example embodiment can determine that the first machine learning model has not been trained so as to be capable of extracting features having high invariance and that the set of images-for-training includes an inappropriate image-for-training.

Thus, the image-for-training selecting apparatus 1 in accordance with the present example embodiment brings about an effect of capable of suitably selecting an image-for-training for use in training of a machine learning model.

(Flow of Image-for-Training Selecting Method S1)

Figure 2:
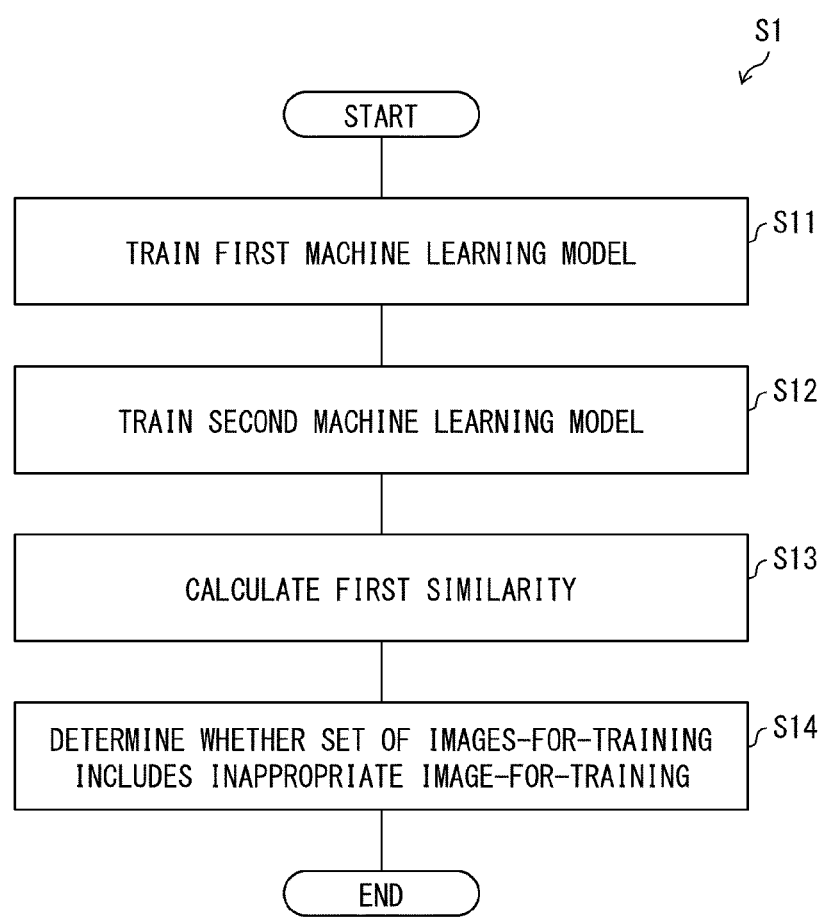
FIG. 2 is a flowchart illustrating a flow of an image-for-training selecting method in accordance with the first example embodiment of the present invention.

The following will describe, with reference to FIG. 2, a flow of an image-for-training selecting method S1 in accordance with the present example embodiment. FIG. 2 is a flowchart illustrating a flow of the image-for-training selecting method S1 in accordance with the present example embodiment.

Step S11

In step S11, the first training section 11 trains, by contrastive learning, the first machine learning model including the first layer group which receives input of an image and generates features of the image, the contrastive learning using a set of images-for-training, which is a plurality of images-for-training.

Step S12

In step S12, the second training section 12 trains, with use of the set of images-for-training, the second machine learning model (i) including the first layer group and the second layer group which is connected to the first layer group and which receives input of the features of the image and classifies the image and (ii) employing, as a pre-trained model, the first machine learning model having been trained by the first training section 11.

Step S13

In step S13, the first calculating section 13 calculates a first similarity, which is a similarity between (i) a parameter of the first layer group (encoder, feature extraction model)

after training by the first training section 11 but before training by the second training section 12 and (ii) a parameter of the first layer group (encoder, feature extraction model) after training by the second training section 12. In other words, in step S13, the first calculating section 13 calculates the first similarity, which is a similarity between the first parameter and the second parameter. The first calculating section 13 supplies the first similarity thus calculated to the first determining section 14.

Step S14

In step S14, the first determining section 14 determines, on the basis of the first similarity calculated by the first calculating section 13, whether or not the set of images-for-training includes an inappropriate image-for-training.

For example, in step S14, if the first parameter and the second parameter are similar to each other, the first determining section 14 determines that the set of images-for-training does not include an inappropriate image-for-training. In this case, if the first similarity is equal to or more than a threshold, the first determining section 14 determines that the set of images-for-training does not include an inappropriate image-for-training. Meanwhile, if the first similarity is less than the threshold, the first determining section 14 determines that the set of images-for-training includes an inappropriate image-for-training.

As described above, the image-for-training selecting method S1 in accordance with the present example embodiment includes: the step S11 in which the first training section 11 trains, by contrastive learning, the first machine learning model including the first layer group which receives input of an image and generates features of the image, the contrastive learning using the set of images-for-training, which is the plurality of images-for-training; the step S12 in which the second training section 12 trains, with use of the set of images-for-training, the second machine learning model (i) including the first layer group and the second layer group which is connected to the first layer group and which receives input of the features of the image and classifies the image and (ii) employing, as a pre-trained model, the first machine learning model having been trained by the first training section 11; the step S13 in which the first calculating section 13 calculates a first similarity, which is a similarity between (i) a parameter of the first layer group (encoder, feature extraction model) after training by the first training section 11 but before training by the second training section 12 and a parameter of the first layer group (encoder, feature extraction model) after training by the second training section 12; and the step S14 in which the first determining section 14 determines, on the basis of the first similarity calculated by the first calculating section 13, whether or not the set of images-for-training includes an inappropriate image-for-training. Thus, with the image-for-training selecting method S1 in accordance with the present example embodiment, it is possible to attain an effect similar to the effect given by the above-described image-for-training selecting apparatus 1.

Second Example Embodiment

The following description will discuss a second example embodiment of the present invention in detail with reference to the drawings. Note that members having identical functions to those explained in the first example embodiment are given identical reference signs, and a description thereof will be omitted.

(Overview of Image-for-Training Selecting Apparatus 2)

The image-for-training selecting apparatus 2 in accordance with the present example embodiment is an apparatus that selects some of a plurality of images as a set of images-for-training, which is a plurality of images-for-training used for use in training of a machine learning model, and outputs the set of images-for-training if the set of images-for-training is appropriate for machine learning. For example, the image-for-training selecting apparatus 2 selects images-for-training by determining whether or not a set of images-for-training, which is the plurality of images-for-training, includes an inappropriate image-for-training, and outputs the set of images-for-training if the set of images-for-training does not include an inappropriate image-for-training.

Meanwhile, if the image-for-training selecting apparatus 2 determines that the set of images-for-training includes an inappropriate image-for-training, the image-for-training selecting apparatus 2 selects a set of images-for-training which is different from the selected set of images-for-training. For example, the image-for-training selecting apparatus 2 selects a set of images-for-training which is different from the selected set of images-for-training, by replacing at least one of the images-for-training included in the selected set of images-for-training with an unselected image-for-training.

The image-for-training selecting apparatus 2 selects an image-for-training by determining whether or not the newly selected set of images-for-training includes an inappropriate image-for-training. Then, if the newly selected set of images-for-training does not include an inappropriate image-for-training, the image-for-training selecting apparatus 2 outputs that set of images-for-training.

Examples of the inappropriate image-for-training include an image-for-training having an incorrect training label. Further, examples of the case where the set of images-for-training includes an inappropriate image-for-training also include a case where imbalance is present in the plurality of images-for-training included in the set of images-for-training.

(Configuration of Image-for-Training Selecting Apparatus 2)

Figure 3:
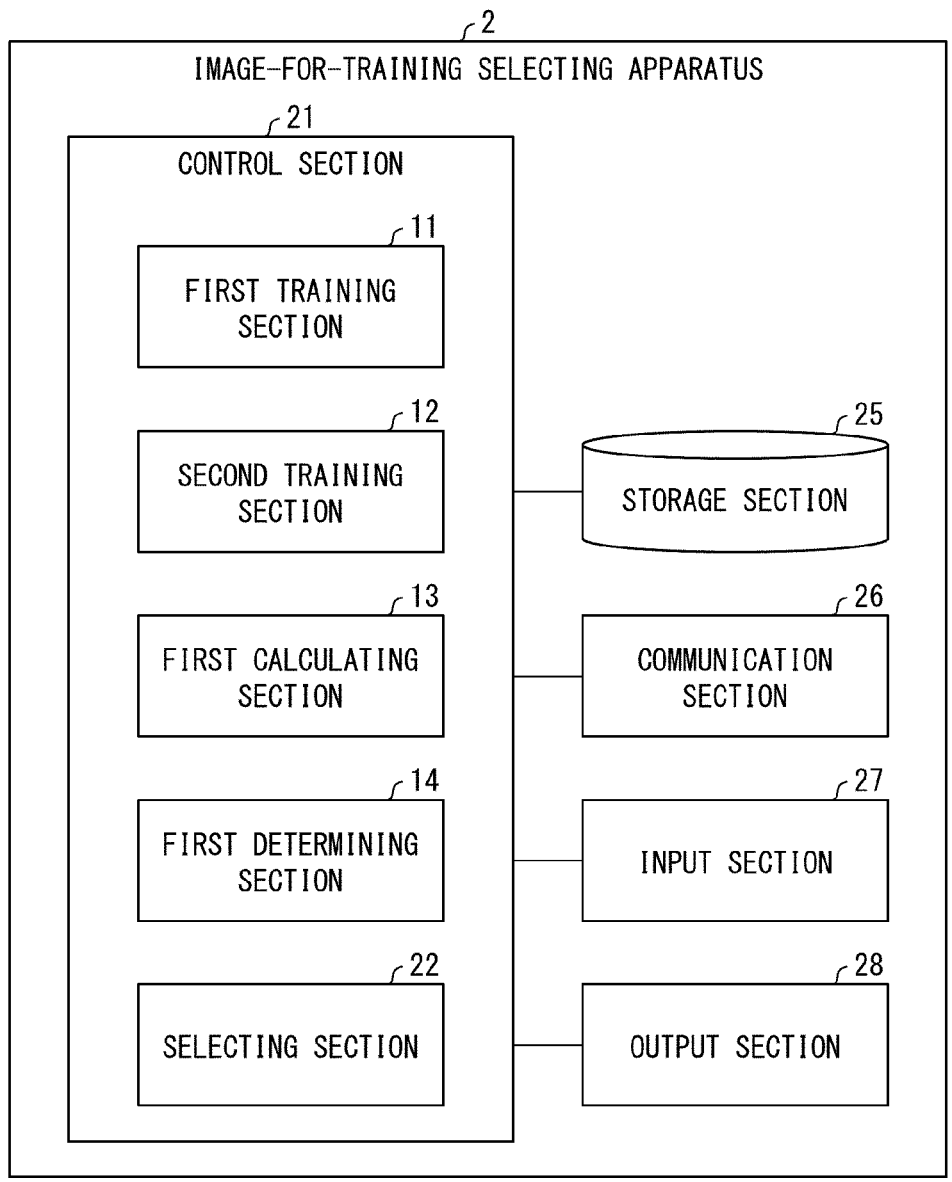
FIG. 3 is a block diagram illustrating a configuration of an image-for-training selecting apparatus in accordance with a second example embodiment of the present invention.

The following will describe, with reference to FIG. 3, a configuration of the image-for-training selecting apparatus 2 in accordance with the present example embodiment. FIG. 3 is a block diagram illustrating a configuration of the image-for-training selecting apparatus 2 in accordance with the present example embodiment. As shown in FIG. 3, the image-for-training selecting apparatus 2 includes a control section 21, a storage section 25, a communication section 26, an input section 27, and an output section 28.

The storage section 25 stores therein data which is referred to by the control section 21. Examples of the data stored in the storage section 25 include an image-for-training and a training label corresponding to an image-for-training.

The communication section 26 is a communication module that communicates with another apparatus connected thereto via a network. For example, the communication section 26 receives an image-for-training, and/or outputs a set of images-for-training having been determined as not including an inappropriate image-for-training.

The input section 27 is an interface for obtaining data from another apparatus connected thereto. For example, the input section 27 obtains an image-for-training.

The output section 28 is an interface for outputting data to another apparatus connected thereto. For example, the output section 28 outputs a set of images-for-training having been determined as not including an inappropriate image-for-training.

(Function of Control Section 21)

The control section 21 controls the constituent elements included in the image-for-training selecting apparatus 2. Further, as shown in FIG. 3, the control section 21 includes a first training section 11, a second training section 12, a first calculating section 13, a first determining section 14, and a selecting section 22. In the present example embodiment, the first training section 11, the second training section 12, the first calculating section 13, the first determining section 14, and the selecting section 22 are configurations respectively realizing a first training means, a second training means, a first calculating means, a first determining means, and a selecting means.

The first training section 11 trains a machine learning model by contrastive learning. In an example, the first training section 11 trains, by contrastive learning, a first machine learning model including a first layer group which receives input of an image and generates features of the image, the contrastive learning using a set of images-for-training, which is a plurality of images-for-training selected by the later-described selecting section 22.

Figure 4:
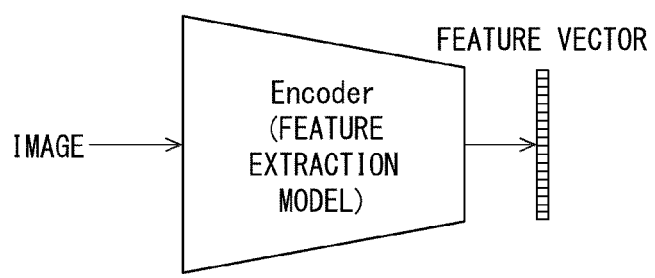
FIG. 4 is a view illustrating an example of a first machine learning model in the second example embodiment of the present invention.

FIG. 4 shows an example of the first machine learning model. FIG. 4 is a view illustrating an example of the first machine learning model in the present example embodiment. As shown in FIG. 4, the first machine learning model includes an encoder (feature extraction model), which is a first layer group that receives input of an image and outputs a feature vector as features of the image.

The second training section 12 trains a machine learning model by a known method. In an example, the second training section 12 trains, with use of the set of images-for-training, a second machine learning model (i) including the first layer group and a second layer group which is connected to the first layer group and which receives input of the features of the image and classifies the image and (ii) employing the first machine learning model as a pre-trained mode.

Figure 5:
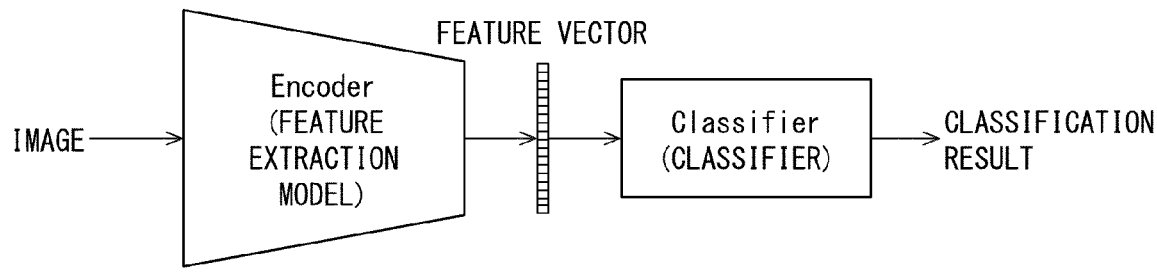
FIG. 5 is a view illustrating an example of a second machine learning model in the second example embodiment of the present invention.

FIG. 5 shows an example of the second machine learning model. FIG. 5 is a view illustrating an example of the second machine learning model in the present example embodiment. As shown in FIG. 5, the second machine learning model includes the first layer group (encoder, feature extraction model) including the first machine learning model trained by the first training section 11 and the second layer group (classifier) that outputs a classification result obtained by classifying an input image. In other words, the second machine learning model is a combination of the first layer group (encoder, feature extraction model) and the second layer group (classifier).

In an example, the first machine learning model receives a pathologic image including a specimen cell as a subject, and the second machine learning model outputs a classification result, which is a result of classifying the specimen cell as being benign or being malignant.

In the following description, the first layer group (encoder, feature extraction model) of the first machine learning model after training by the first training section 11 but before training by the second training section 12 may also be referred to as a "feature extraction model M1". Further, the first layer group (encoder, feature extraction model) after training by the second training section 12 may also be referred to as a "feature extraction model M2". In a case where there is no need to distinguish these feature extraction models from each other, the expression "feature extraction model" is simply used.

The first calculating section 13 calculates a first similarity, which is a similarity between a parameter (weight, first parameter) of the feature extraction model M1 and a parameter (second parameter) of the feature extraction model M2. For example, the first calculating section 13 calculates second similarities, which are similarities of respective layers of the first layer group (encoder, feature extraction model) included in the first machine learning model. In this case, the first calculating section 13 calculates a first similarity on the basis of the second similarities thus calculated. An example of the process in which the first calculating section 13 calculates the first similarity and second similarities will be described later.

The first determining section 14 determines whether or not the set of images-for-training includes an inappropriate image-for-training. In an example, the first determining section 14 determines, on the basis of the first similarity calculated by the first calculating section 13, whether or not the set of images-for-training includes an inappropriate image-for-training.

For example, if the first similarity is equal to or more than a threshold, the first determining section 14 determines that the set of images-for-training does not include an inappropriate image-for-training. Meanwhile, if the first similarity is less than the threshold, the first determining section 14 determines that the set of images-for-training includes an inappropriate image-for-training.

The selecting section 22 selects some of a plurality of images as a set of images-for-training. In an example, the selecting section 22 selects, as the set of images-for-training, some of the images-for-training stored in the storage section 25. The number of images-for-training selected by the selecting section 22 is not particularly limited. In an example, the selecting section 22 may randomly select a given number of images-for-training (e.g., 9500 or more images-for-training) from among all the images-for-training (e.g., 10000 images-for-training). The selecting section 22 supplies the selected set of images-for-training to the first training section 11 and the second training section 12.

Further, in a case where the selecting section 22 repeatedly selects some of a plurality of images as a set of images-for-training, the selecting section 22 selects a set of images-for-training which is different from an already-selected set(s) of images-for-training. In an example, if the first determining section 14 determines that a set of images-for-training includes an inappropriate image-for-training, the selecting section 22 selects a set of images-for-training which is different from the selected set of images-for-training. Thanks to this configuration of the selecting section 22, the first determining section 14 can determine whether or not an inappropriate image-for-training is included in the set of images-for-training different from the set of images-for-training having been determined as including an inappropriate image-for-training.

(Flow of Image-for-Training Selecting Method S2)

Figure 6:
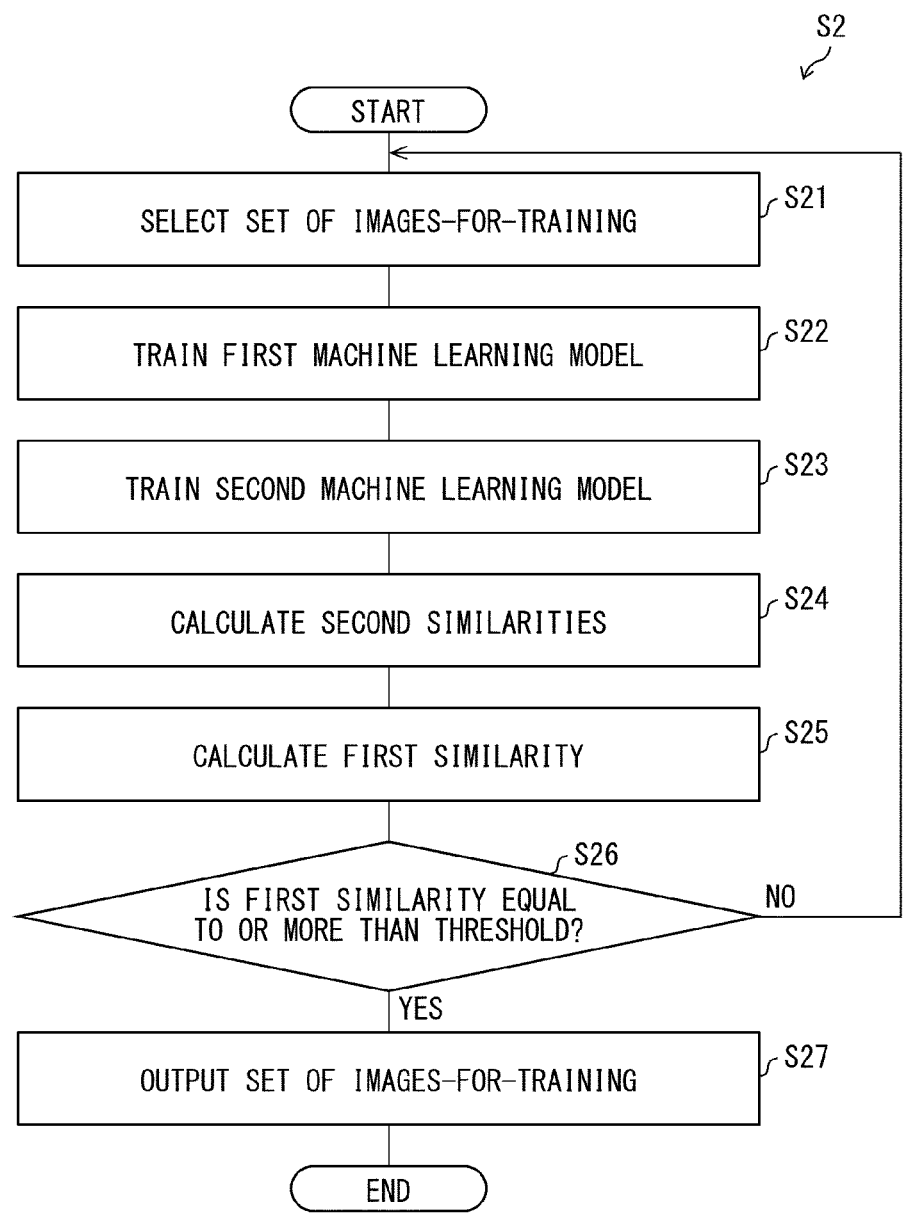
FIG. 6 is a flowchart illustrating a flow of an image-for-training selecting method in accordance with the second example embodiment of the present invention.

The following will describe, with reference to FIG. 6, a flow of an image-for-training selecting method S2 in accordance with the present example embodiment. FIG. 6 is a flowchart illustrating a flow of the image-for-training selecting method S2 in accordance with the present example embodiment.

Step S21

In step S21, the selecting section 22 selects, as a set of images-for-training, some of the images-for-training stored in the storage section 25. The selecting section 22 supplies the selected set of images-for-training to the first training section 11 and the second training section 12.

Step S22

In step S22, the first training section 11 trains the first machine learning model including the first layer group (encoder, feature extraction model) by contrastive learning involving use of the set of images-for-training supplied by the selecting section 22. The first layer group (encoder, feature extraction model) of the first machine learning model after training by the first training section 11 in step S22 is the feature extraction model M1.

Step S23

In step S23, the second training section 12 trains, with use of the set of images-for-training supplied by the selecting section 22, the second machine learning model (i) including the first layer group and the second layer group and (ii) employing the feature extraction model M1 as a pre-trained model. The first layer group (encoder, feature extraction model) after training by the second training section 12 in step S23 is the feature extraction model M2.

Step S24

In step S24, the first calculating section 13 calculates second similarities, which are similarities of respective layers of the first layer group included in the first machine learning model. In other words, in step S24, the first calculating section 13 calculates a similarity between a first parameter of each layer of the feature extraction model M1 and a second parameter of a corresponding layer of the feature extraction model M2. The first calculating section 13 stores the second similarities thus calculated in the storage section 25.

In an example, the first calculating section 13 calculates a "similarity$_k$(x,y)", which is a second similarity of a k-th layer, according to the following formula (1):

$$\text{similarity}_k(x, y) = \frac{x \cdot y}{\|x\|\|y\|} = \frac{\sum_n x_n y_n}{\sqrt{\sum_n x_n^2} \sqrt{\sum_n y_n^2}} \quad (1)$$

Here, x denotes a first parameter (weight vector) of a k-th layer of the feature extraction model M1, and x=($x_1$, $x_2$, $x_3$, ..., $x_n$). Further, y denotes a second parameter (weight vector) of a k-th layer of the feature extraction model M2, and y=($y_1$, $y_2$, $y_3$, ..., $y_n$).

Step S25

In step S25, the first calculating section 13 calculates a first similarity on the basis of the second similarities stored in the storage section 25. The first calculating section 13 stores the first similarity thus calculated in the storage section 25.

In an example, the first calculating section 13 calculates, as a first similarity, a value given by dividing a sum of the second similarities by the number of layers in the first layer group included in the first machine learning model. Specifically, the first calculating section 13 calculates, with use of the second similarity "similarity$_k$(x,y)" calculated according to the above-described formula (1), a "similarity", which is the first similarity, according to the following formula (2):

$$\text{similirity}(x, y) = \frac{\sum_m \text{similarity}_k}{m} \quad (2)$$

Here, "m" denotes the number of layers of the first machine learning model.

In another example, the first calculating section 13 calculates, as the first similarity, a value given by dividing a weighted sum, which is a sum of the second similarities having been given weights, by a sum of values of the weights. Specifically, the first calculating section 13 calculates, with use of the second similarity "similarity$_k$(x,y)" calculated according to the above-described formula (1), a "similarity", which is the first similarity, according to the following formula (3):

$$\text{similirity}(x, y) = \frac{\sum_m W_k \text{similarity}_k}{\sum_m W_k} \quad (3)$$

Here, $W_k$ denotes a weight given to a k-th second similarity.

Further, the first calculating section 13 may give a heavier weight value to, among the second similarities of the layers of the first layer group, a second similarity of a layer (deeper layer) closer to an output of the first machine learning model. With this configuration, the first calculating section 13 can allow a second similarity of a layer which is close to the output and whose rough features are to be focused on to give a greater effect on the first similarity.

Step S26

In step S26, the first determining section 14 determines whether or not the first similarity stored in the storage section 25 is equal to or more than a threshold.

Step S27

If the first determining section 14 determines, in step S27, that the first similarity is equal to or more than the threshold (step S26: YES), the first determining section 14 outputs the set of images-for-training in step S27. In other words, if the first determining section 14 determines that the set of images-for-training does not include an inappropriate image-for-training, the first determining section 14 outputs the set of images-for-training.

Meanwhile, if the first determining section 14 determines, in step S26, that the first similarity is less than the first similarity (step S26: NO), the image-for-training selecting apparatus 2 returns to the process in step S21. In other words, if the first determining section 14 determines that the set of images-for-training includes an inappropriate image-for-training, the image-for-training selecting apparatus 2 returns to the process in step S21.

In step S21, the selecting section 22 selects a set of images-for-training which is different from the selected set of images-for-training. Then, in processes of step S22 and its subsequent step(s), it is determined whether or not the newly selected set of images-for-training includes an inappropriate image-for-training.

(Effects of Second Example Embodiment)

As described above, according to the image-for-training selecting apparatus 2 in accordance with the present example embodiment, if it is determined that the set of images-for-training includes an inappropriate image-for-training, the selecting section 22 selects a set of images-for-training which is different from the selected set of images-for-training. Then, the first determining section 14 determines whether or not the set of images-for-training newly selected by the selecting section 22 includes an inappropriate image-for-training. With this configuration, the image-for-training selecting apparatus 2 in accordance with the present example embodiment does not output the set of images-for-training until it is determined that the set of images-for-training does not include an inappropriate image-for-training. Therefore, it is possible to output an appropriate set of images-for-training.

Variation 1

An image-for-training selecting apparatus 2A in accordance with a variation of the present example embodiment executes, until elapse of a given period of time, processes from a process of selecting a set of images-for-training to a process of determining whether or not the set of images-for-training includes an inappropriate image-for-training. Alternatively, the image-for-training selecting apparatus 2A may be configured to execute, a given number of times instead of (or in addition to) until elapse of the given period of time, the processes from the process of selecting a set of images-for-training to the process of determining whether or not the set of images-for-training includes an inappropriate image-for-training.

The image-for-training selecting apparatus 2A is identical in configuration to the image-for-training selecting apparatus 2, and therefore an explanation thereof is omitted.
(Flow of Image-for-Training Selecting Method S2A)

Figure 7:
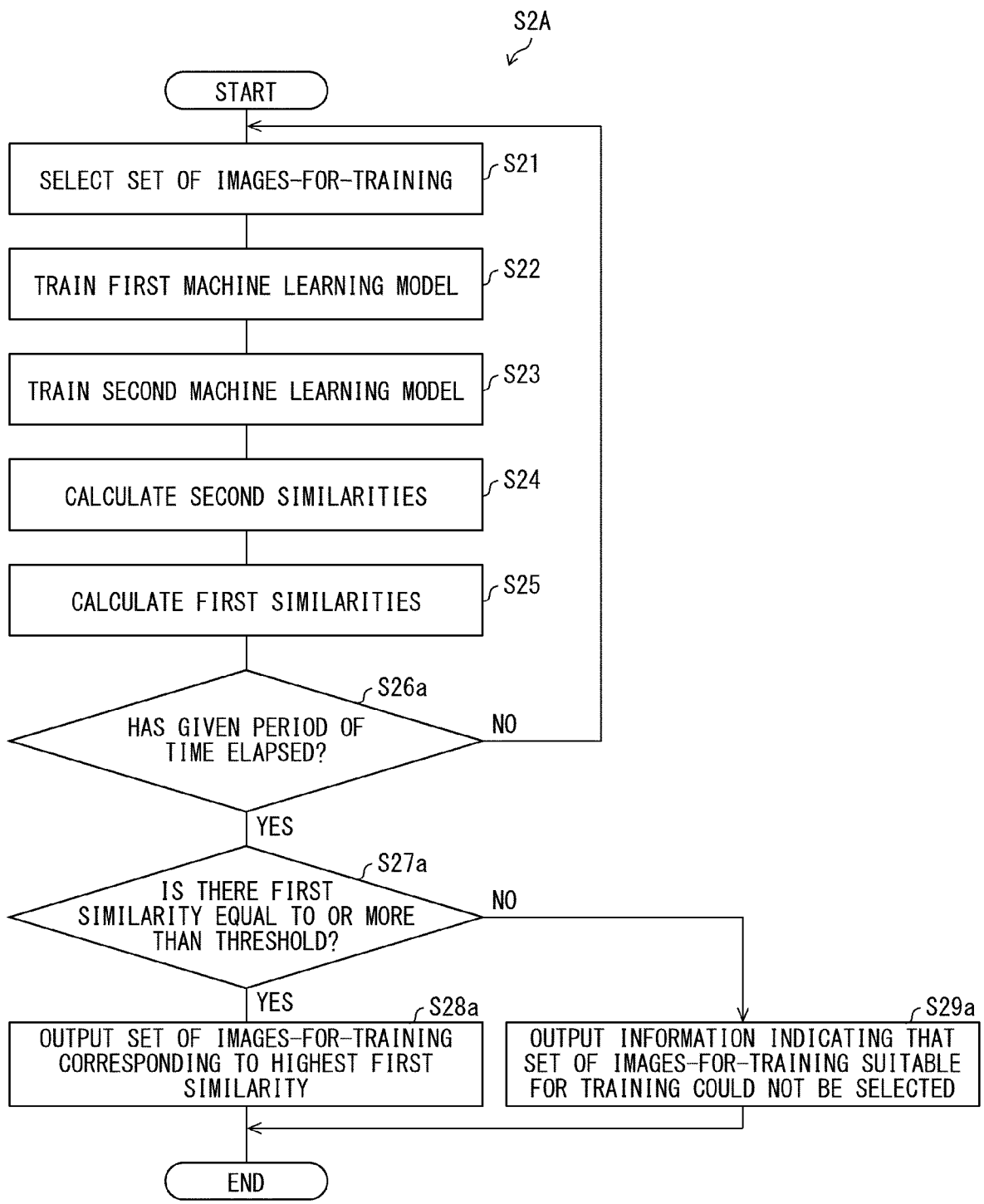
FIG. 7 is a flowchart illustrating a flow of an image-for-training selecting method in accordance with a variation of the second example embodiment of the present invention.

The following will describe, with reference to FIG. 7, a flow of the image-for-training selecting method S2A in accordance with a variation of the present example embodiment. FIG. 7 is a flowchart illustrating a flow of an image-for-training selecting method S2A in accordance with a variation of the present example embodiment.

Steps S21 to S25

Processes of steps S21 to S25, from a process in which a calculating selecting section 22 selects a set of images-for-training to a process in which a first calculating section 13 calculates a first calculating section, are identical to those described above, and therefore an explanation thereof is omitted.

Step S26a

In step S26a, the first determining section 14 determines whether or not a given period of time has elapsed.

If the first determining section 14 determines, in step S26a, that the given period of time has not been elapsed (step S26a: NO), the image-for-training selecting apparatus 2A returns to the process in step S21. Then, in step S21, the selecting section 22 selects a set of images-for-training which is different from the selected set of images-for-training, and processes of step S22 and its subsequent step(s) are executed with use of the selected set of images-for-training.

Note that in the case where the image-for-training selecting apparatus 2A is configured to execute, a given number of times instead of (or in addition to) until elapse of the given period of time, the processes from the process of selecting a set of images-for-training to the process of determining whether or not the set of images-for-training includes an inappropriate e image-for-training, the first determining section 14 may be configured to determine whether or not the process in step S26a was executed the given number of times, instead of (or in addition to) determination of whether or not the given period of time has been elapsed.

With this configuration, in step S26a, if it is determined that the process in step S26a has been executed the given number of times (step S26a: YES), the image-for-training selecting apparatus 2A advances to the process in step S27a. Meanwhile, in step S26a, if it is determined that the process in step S26a has not been executed the given number of times (step S26a: NO), the image-for-training selecting apparatus 2A returns to the process in step S21. In step S25, the first calculating section 13 stores the first similarity in the storage section 25 every time the first calculating section 13 calculates the first similarity. That is, given that the processes from step S21 to step S25 are repeatedly carried out N times, the first calculating section 13 stores N first similarities in the storage section 25.

Step S27a

If it is determined, in step S26a, that the given period of time has elapsed (step S26a: YES), the first determining section 14 determines, in step S27a, whether or not the plurality of first similarities stored in the storage section 25 include a first similarity(ies) being equal to or more than the threshold.

Step S28a

If it is determined, in step S27a, that the plurality of first similarities include a first similarity(ies) being equal to or more than the threshold (step S27a: YES), the first determining section 14 outputs, in step S28a, a set of images-for-training corresponding to a highest one of the first similarity(ies) being equal to or more than the threshold. In other words, the first determining section 14 outputs, among the plurality of sets of images-for-training, a set of images-for-training determined as being most suitable for training.

Step S29a

If it is determined, in step S27a, that the plurality of first similarities do not include a first similarity (ies) being equal to or more than the threshold (step S27a: NO), the first determining section 14 outputs, in step S29a, information indicating that a set of images-for-training suitable for training could not be selected.

Effects of Variation 1

The image-for-training selecting apparatus 2A in accordance with the variation of the present example embodiment executes, until elapse of a given period of time (or execution of a given number of times), the processes from the process of selecting a set of images-for-training to the process of determining whether or not the set of images-for-training includes an inappropriate image-for-training. Thus, in addition to the effect given by the image-for-training selecting apparatus 2 in accordance with the second example embodiment, the image-for-training selecting apparatus 2A in accordance with the variation of the present example embodiment can output, among selected sets of images-for-training, a set of images-for-training determined as being most suitable for training.

Third Example Embodiment

The following description will discuss a third example embodiment of the present invention in detail with reference to the drawings. Note that members having identical functions to those explained in the foregoing example embodiments are given identical reference signs, and a description thereof will be omitted.

(Configuration of Image-for-Training Selecting Apparatus 3)

An image-for-training selecting apparatus 3 in accordance with the present example embodiment can bring about the functions of the above-described image-for-training selecting apparatus 2 (and the image-for-training selecting apparatus 2A), and can determine whether or not imbalance is present in attributes of a plurality of images-for-training included in a set of images-for-training. If the image-for-training selecting apparatus 3 determines that imbalance is present in the attributes of the plurality of images-for-training included in the set of images-for-training, the image-for-training selecting apparatus 3 determines that the set of images-for-training includes an inappropriate image-for-training. The attributes of the images-for-training will be described later.

Figure 8:
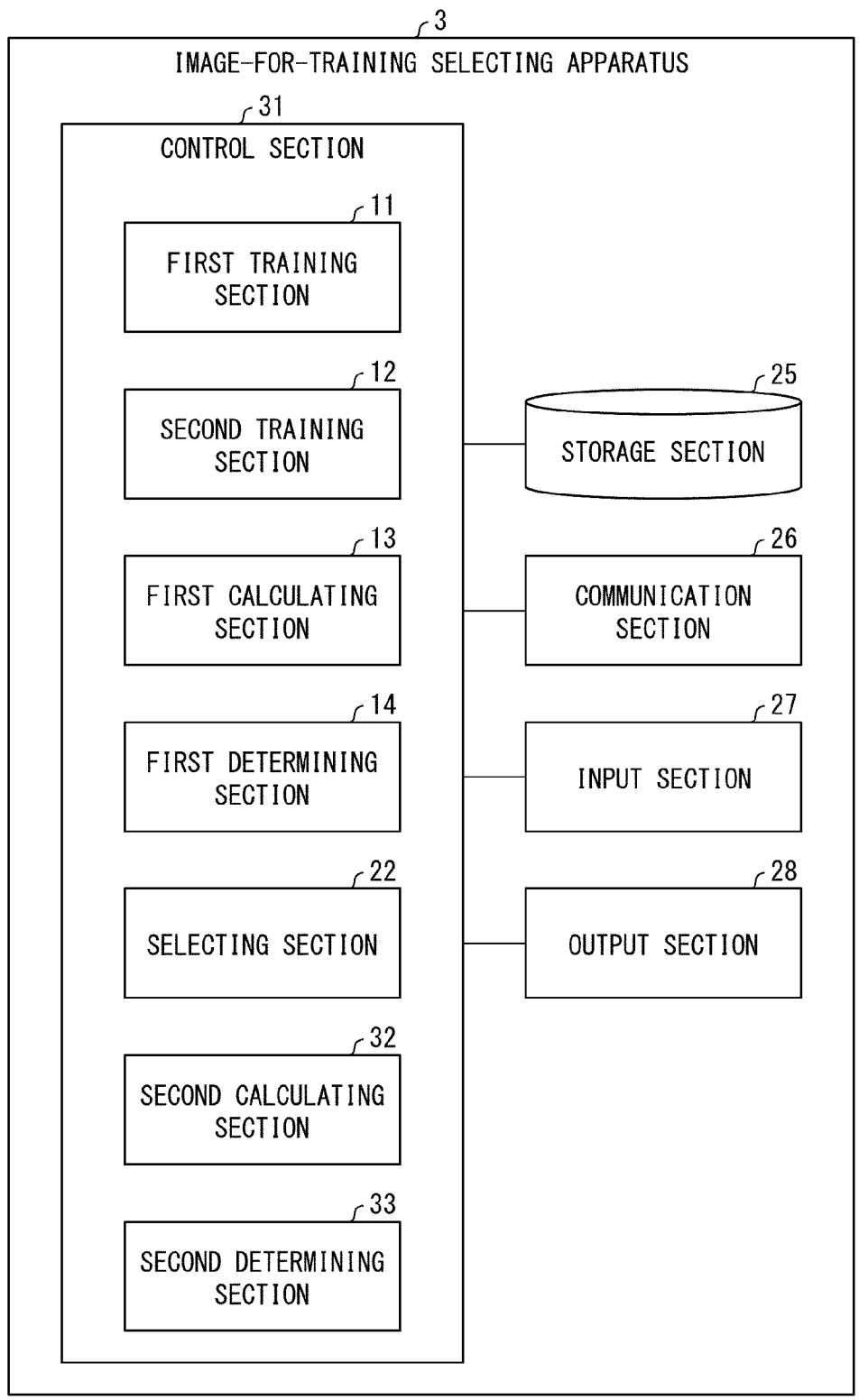
FIG. 8 is a block diagram illustrating a configuration of an image-for-training selecting apparatus in accordance with a third example embodiment of the present invention.

The following will describe, with reference to FIG. 8, a configuration of the image-for-training selecting apparatus 3 in accordance with the present example embodiment. FIG. 8 is a block diagram illustrating a configuration of the image-for-training selecting apparatus 3 in accordance with the present example embodiment. As shown in FIG. 8, the image-for-training selecting apparatus 2 includes a control section 31, a storage section 25, a communication section 26, an input section 27, and an output section 28.

The storage section 25, the communication section 26, the input section 27, and the output section 28 are identical to those described in the first example embodiment, and therefore an explanation thereof is omitted.

(Functions of Control Section 31)

The control section 31 controls the constituent elements included in the image-for-training selecting apparatus 3. Further, as shown in FIG. 8, the control section 31 includes a first training section 11, a second training section 12, a first calculating section 13, a first determining section 14, a selecting section 22, a second calculating section 32, and a second determining section 33. In the present example embodiment, the first training section 11, the second training section 12, the first calculating section 13, the first determining section 14, the selecting section 22, the second calculating section 32, and the second determining section 33 are configurations respectively realizing a first training means, a second training means, a first calculating means, a first determining means, a selecting means, a second calculating means, and a second determining means.

The first training section 11, the second training section 12, the first calculating section 13, the first determining section 14, and the selecting section 22 are identical to those described in the foregoing example embodiments, and therefore an explanation thereof is omitted.

The second calculating section 32 calculates an index indicating a degree of imbalance in attributes of a plurality of images. In an example, the second calculating section 32 calculates an index indicating a degree of imbalance in attributes of a plurality of images-for-training included in a set of images-for-training selected by the selecting section 22. In an example described below, a variance is used as the index. However, the index is not limited to the variance. The following will describe the attributes of the images-for-training with reference to FIG. 9. FIG. 9 is a view illustrating the attributes of the plurality of images-for-training in the present example embodiment.

As shown in the upper part of FIG. 9, in a case where the images-for-training are images captured in any of facilities of hospitals A to Z, the second calculating section 32 sets, as an attribute, a facility where image-capturing was carried out. In this case, for each of the hospitals where a corresponding one(s) of the plurality of images-for-training included in the set of images-for-training was/were captured, the second calculating section 32 calculates the number of pieces of data. Then, the second calculating section 32 calculates a variance as an index indicating a degree of imbalance in the facilities where the images-for-training included in the set of images-for-training were captured.

As shown in the middle part of FIG. 9, in a case where the images-for-training are images captured by any of models of scanners A to Z, the second calculating section 32 sets, as an attribute, a model of the image-capturing apparatus. Also in this case, the second calculating section 32 calculates a variance as an index indicating a degree of imbalance in the models of the image-capturing apparatuses having captured the images-for-training included in the set of images-for-training.

As shown in the lower part of FIG. 9, in a case where the images-for-training are images including, as subjects, cells such as a normal epithelial cell, small cell carcinoma, adenocarcinoma, and squamous cell carcinoma, the second calculating section 32 sets, as an attribute, a type of a cell included as a subject. Also in this case, the second calculating section 32 calculates a variance as an index indicating a degree of imbalance in the types of cells included as the subjects in the images-for-training included in the set of images-for-training.

The second calculating section 33 determines whether or not the index calculated by the second calculating section 32 is not less than the threshold. In other words, the second determining section 33 determines whether or not imbalance is present in the attributes of the plurality of images-for-training included in the set of images-for-training. In an example, in a case where the second calculating section 32 calculates a variance as the index, the second determining section 33 determines whether the variance value is not less than the threshold (imbalance is present) or less than the threshold (imbalance is not present).

(Flow of Image-for-Training Selecting Method S3)

Figure 10:
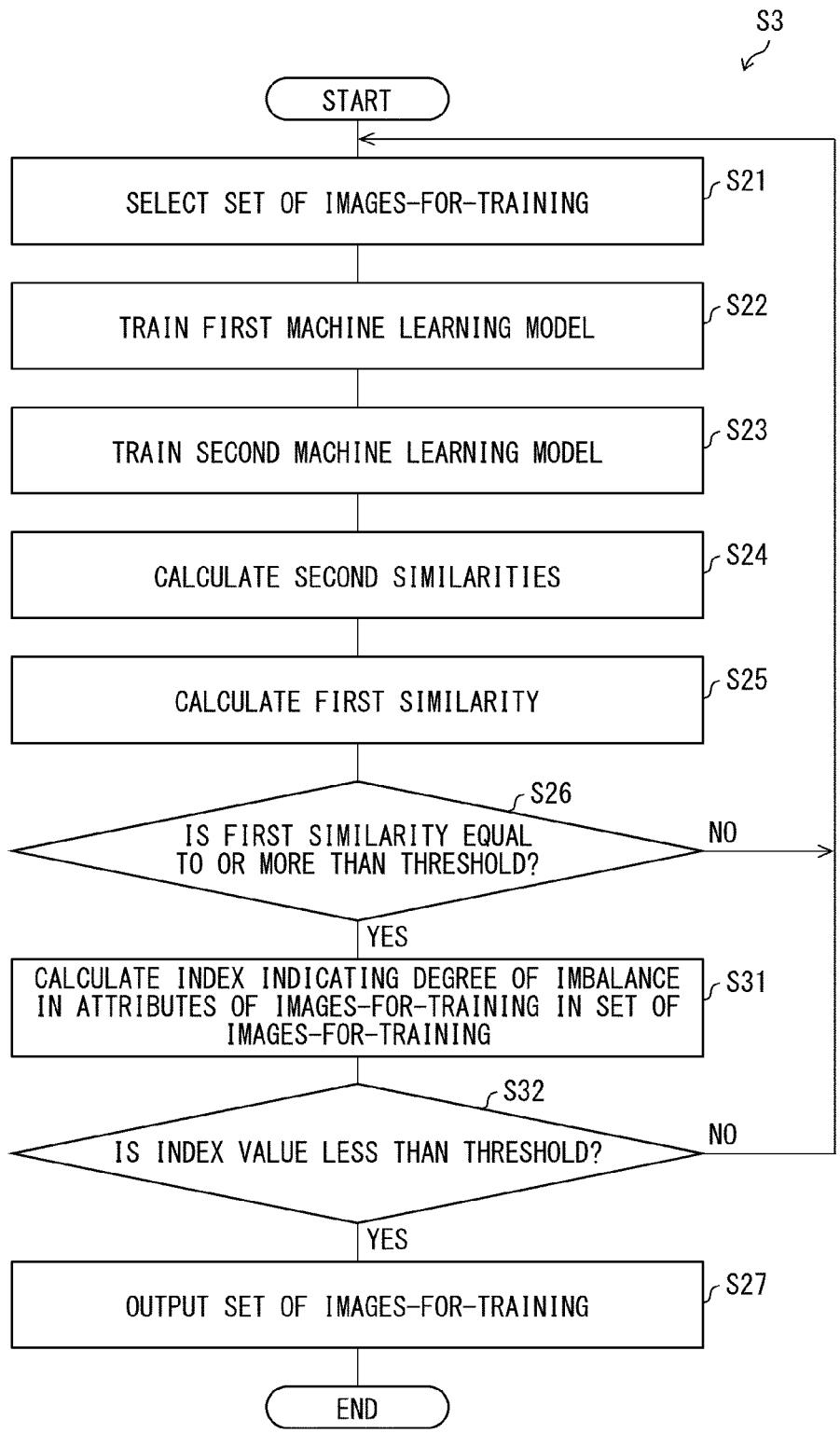
FIG. 10 is a flowchart illustrating a flow of an image-for-training selecting method in accordance with the third example embodiment of the present invention.

The following will describe, with reference to FIG. 10, a flow of an image-for-training selecting method S3 in accordance with the present example embodiment. FIG. 10 is a flowchart illustrating a flow of the image-for-training selecting method S3 in accordance with the present example embodiment.

Steps S21 to S26

Processes of steps S21 to S26, from a process in which the selecting section 22 selects a set of images-for-training to the process in which a first determining section 14 determines whether or not a first similarity is equal to or more than a threshold, are identical to those described above, and therefore an explanation thereof is omitted.

Step S31

If it is determined, in step S26, that the first similarity is equal to or more than the first similarity (step S26: YES), the second calculating section 32 calculates, in step S31, an index indicating a degree of imbalance in attributes of a plurality of images-for-training included in a set of images-for-training selected by a selecting section 22.

Step S32

In step S32, the second determining section 33 determines whether or not the index calculated by the second calculating section 32 is less than a threshold.

If it is determined, in step S32, that the index calculated by the second calculating section 32 is not less than the threshold (step S32: NO), the image-for-training selecting apparatus 3 returns to the process in step S21. Then, in step S21, the selecting section 22 selects a set of images-for-training which is different from the selected set of images-for-training. In other words, if imbalance is present in the attributes of the plurality of images-for-training included in the set of images-for-training, the selecting section 22 selects a set of images-for-training which is different from the selected set of images-for-training.

As described above, step S32 is a process to be executed when the index is the variance. Also in cases where the index is any of indices other than the variance, if the second determining section 33 determines, in step S32, that imbalance is present in the attributes of the plurality of images-for-training included in the set of images-for-training on the basis of the index, the image-for-training selecting apparatus 3 returns to the process in step S21.

Step S27

If the second determining section 33 determines, in step S32, that the index calculated by the second calculating section 32 is less than the threshold (step S32: YES), the second determining section 33 outputs the set of images-for-training in step S27. In other words, if imbalance is not present in the attributes of the plurality of images-for-training included in the set of images-for-training, the second determining section 33 outputs the set of images-for-training.

Effect of Third Example Embodiment

As described above, the image-for-training selecting apparatus 3 in accordance with the present example embodiment includes: the second calculating section 32 that calculates an index indicating a degree of imbalance in attributes of a plurality of images-for-training selected by the selecting section 22; and the second determining section 33 that determines whether or not the index calculated by the second calculating section 32 is less than a threshold. With the configuration, in addition to the effect given by the image-for-training selecting apparatus 1 in accordance with the first example embodiment, the image-for-training selecting apparatus 3 in accordance with the present example embodiment can provide a set of images-for-training including images-for-training in which imbalance is not present.

Variation 2

An image-for-training selecting apparatus 3A in accordance with a variation of the present example embodiment determines whether or not imbalance is present attributes of a plurality of images-for-training included in a set of images-for-training, the determining being carried out before training of the first machine learning model.

The image-for-training selecting apparatus 3A is identical in configuration to the image-for-training selecting apparatus 3, and therefore an explanation thereof is omitted.

(Flow of Image-for-Training Selecting Method S3A)

Figure 11:
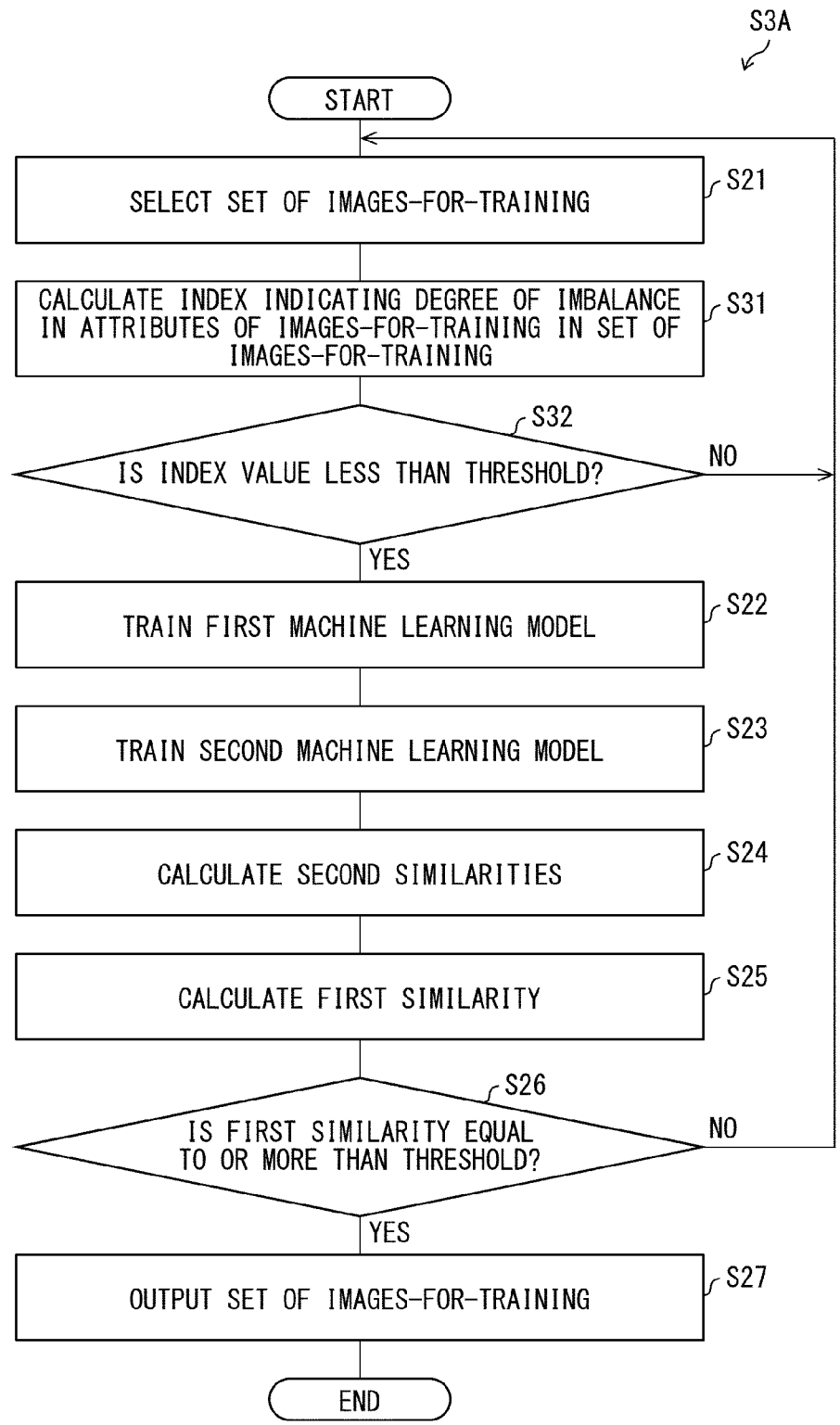
FIG. 11 is a flowchart illustrating a flow of the image-for-training selecting method in accordance with a variation of the third example embodiment of the present invention.

The following will describe, with reference to FIG. 11, a flow of an image-for-training selecting method S3A in accordance with a variation of the present example embodiment. FIG. 11 is a flowchart illustrating a flow of the image-for-training selecting method S3A in accordance with the variation of the present example embodiment.

Step S21

In step S21, the selecting section 22 selects, as a set of images-for-training, some of the images-for-training stored in the storage section 25. The selecting section 22 supplies the selected images-for-training to the second calculating section 32.

Step S31

In step S31, the second calculating section 32 calculates an index indicating a degree of imbalance in attributes of a plurality of images-for-training included in the set of images-for-training selected by the selecting section 22.

Step S32

In step S32, the second determining section 33 determines whether or not the index calculated by the second calculating section 32 is less than a threshold.

If it is determined, in step S32, that the index calculated by the second calculating section 32 is not less than the threshold (step S32: NO), the image-for-training selecting apparatus 3A returns to the process in step S21. In other words, if imbalance is present in the attributes of the plurality of images-for-training included in the set of images-for-training, the selecting section 22 selects, in step S21, a set of images-for-training which is different from the selected set of images-for-training.

Meanwhile, if it is determined, in step S32, that the index calculated by the second calculating section 32 is less than the threshold (step S32: YES), the selecting section 22 supplies the selected set of images-for-training to the first training section 11 and the second training section 12. In other words, if the second determining section 33 determines that imbalance is not present in the attributes of the plurality of images-for-training included in the set of images-for-training, the selecting section 22 supplies the selected set of images-for-training to the first training section 11 and the second training section 12.

Steps S22 to S27

Processes of steps S22 to S27, i.e., the processes in which the first training section 11 trains the first machine learning model by contrastive learning and, if the first determining section 14 determines that the first similarity is equal to or more than the threshold, the first determining section 14 outputs the set of images-for-training, are identical to the processes described above, an explanation thereof is omitted.

Effect of Variation 2

As described above, the image-for-training selecting apparatus 3A in accordance with the variation of the present example embodiment determines whether or not imbalance is present attributes of a plurality of images-for-training included in a set of images-for-training, the determining being carried out before training of the first machine learning model. With this configuration, in addition to the effect given by the image-for-training selecting apparatus 3 in accordance with the third example embodiment, the image-for-training selecting apparatus 3A in accordance with the variation of the present example embodiment can reduce processing load, since the image-for-training selecting apparatus 3A does not train the machine learning model if imbalance is present in the attributes of the plurality of images-for-training included in the set of images-for-training.

[Software Implementation Example]

Part of or the whole of functions of the image-for-training selecting apparatuses 1, 2, 2A, 3, and 3A can be realized by hardware such as an integrated circuit (IC chip) or can be alternatively realized by software.

Figure 12:
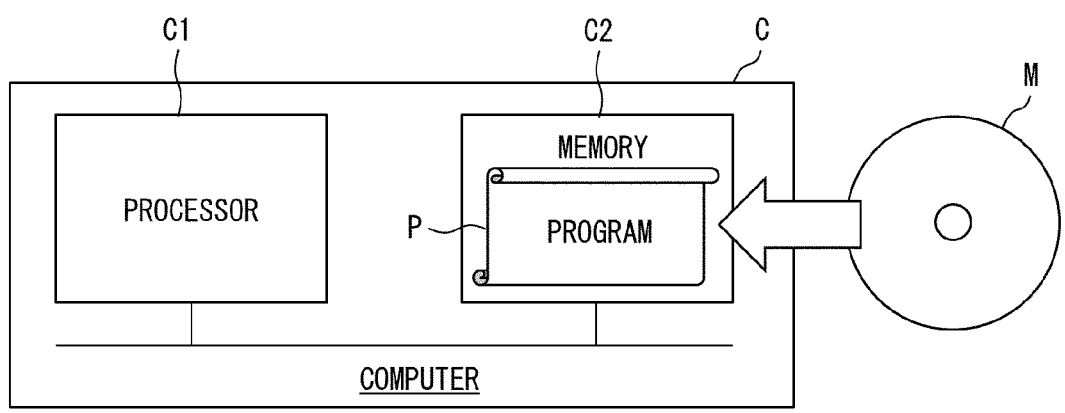
FIG. 12 is a block diagram illustrating a configuration of an example of a hardware configuration of the image-for-training selecting apparatus in accordance with each of the example embodiments of the present invention.

In the latter case, each of the image-for-training selecting apparatuses 1, 2, 2A, 3, and 3A is realized by, for example, a computer that executes instructions of a program that is software realizing the foregoing functions. FIG. 12 shows an example of such a computer (hereinafter, referred to as a "computer C"). The computer C includes at least one processor C1 and at least one memory C2. The memory C2 has a program P stored therein, the program P causing the computer C to operate as the image-for-training selecting apparatuses 1, 2, 2A, 3, and 3A. In the computer C, the processor C1 reads and executes the program P from the memory C2, thereby realizing the functions of the image-for-training selecting apparatuses 1, 2, 2A, 3, and 3A.

The processor C1 may be, for example, a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of any of them. The memory C2 may be, for example, a flash memory, hard disk drive (HDD), solid state drive (SSD), or a combination of any of them.

The computer C may further include a random access memory (RAM) in which the program P is loaded when executed and various data is temporarily stored. In addition, the computer C may further include a communication interface via which the computer C transmits/receives data to/from another device. The computer C may further include an input-output interface via which the computer C is connected to an input-output device such as a keyboard, a mouse, a display, and/or a printer.

The program P can be stored in a non-transitory, tangible storage medium M capable of being read by the computer C. Examples of the storage medium M encompass a tape, a disk, a card, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

Supplementary Remarks 1

The present invention is not limited to the foregoing example embodiments, but can be altered by a skilled person in the art within the scope of the claims. The present invention also encompasses, in its technical scope, any embodiment derived by combining technical means disclosed in differing embodiments.

Supplementary Remarks 2

Some or all of the foregoing example embodiments can be described as below. Note, however, that the present invention is not limited to aspects described below.

Supplementary Note 1

An image-for-training selecting apparatus including: a first training means that trains, by contrastive learning, a first machine learning model including a first layer group which receives input of an image and generates features of the image, the contrastive learning using a set of images-for-training, which is a plurality of images-for-training; a second training means that trains, with use of the set of images-for-training, a second machine learning model (i) including the first layer group and a second layer group which is connected to the first layer group and which receives input of the features of the image and classifies the image and (ii) employing the first machine learning model as a pre-trained model; a first calculating means that calculates a first similarity, which is a similarity between (i) a parameter of the first layer group after training by the first training means but before training by the second training means and (ii) a parameter of the first layer group after training by the second training means; and a first determining means that determines, on a basis of the first similarity, whether or not the set of images-for-training includes an inappropriate image-for-training.

Supplementary Note 2

The image-for-training selecting apparatus described in Supplementary Note 1, further including: a selecting means that selects, as the set of images-for-training, some of a plurality of images-for-training, wherein in a case where the first determining means determines that the set of images-for-training includes an inappropriate image-for-training, the selecting means selects a set of images-for-training which is different from the set of images-for-training having been selected.

Supplementary Note 3

The image-for-training selecting apparatus described in Supplementary Note 1 or 2, wherein: the first calculating means calculates second similarities, which are similarities of respective layers of the first layer group included in the first machine learning model.

Supplementary Note 4

The image-for-training selecting apparatus described in Supplementary Note 3, wherein: the first calculating means calculates, as the first similarity, a value given by dividing a sum of the second similarities by the number of the layers in the first layer group included in the first machine learning model; and in a case where the first similarity is less than a threshold, the first determining means determines that the set of images-for-training includes an inappropriate image-for-training.

Supplementary Note 5

The image-for-training selecting apparatus described in Supplementary Note 3, wherein: the first calculating means calculates, as the first similarity, a value given by dividing a weighted sum, which is a sum of the second similarities having been given weights, by a sum of values of the weights; and in a case where the first similarity is less than a threshold, the first determining means determines that the set of images-for-training includes an inappropriate image-for-training.

Supplementary Note 6

The image-for-training selecting apparatus described in Supplementary Note 5, wherein: the first calculating means gives a heavier weight value to, among the second similarities of the layers of the first layer group, a second similarity of a layer closer to an output of the first machine learning model.

Supplementary Note 7

The image-for-training selecting apparatus described in Supplementary Note 2, further including: a second calculating means that calculates an index indicating a degree of imbalance in attributes of the plurality of images-for-training included in the set of images-for-training selected by the selecting means; and a second determining means that determines whether or not the index calculated by the second calculating means is less than a threshold.

Supplementary Note 8

The image-for-training selecting apparatus described in Supplementary Note 7, wherein: in a case where the second determining means determines that the index is not less than the threshold, the selecting means selects a set of images-for-training which is different from the set of images-for-training having been selected.

Supplementary Note 9

An image-for-training selecting method includes an image-for-training selecting apparatus carrying out: training, by contrastive learning, a first machine learning model including a first layer group which receives input of an image and generates features of the image, the contrastive learning using a set of images-for-training, which is a plurality of images-for-training; training, with use of the set of images-for-training, a second machine learning model (i) including the first layer group and a second layer group which is connected to the first layer group and which receives input of the features of the image and classifies the image and (ii) employing the first machine learning model as a pre-trained model; calculating a first similarity, which is a similarity between (i) a parameter of the first layer group after training by the contrastive learning but before training of the second machine learning model and (ii) a parameter of the first layer group after training of the second machine learning model; and determining, on a basis of the first similarity, whether or not the set of images-for-training includes an inappropriate image-for-training.

Supplementary Note 10

A program for causing a computer to function as an image-for-training selecting apparatus, the program causing the computer to function as: a first training means that trains, by contrastive learning, a first machine learning model including a first layer group which receives input of an image and generates features of the image, the contrastive learning using a set of images-for-training, which is a plurality of images-for-training; a second training means that trains, with use of the set of images-for-training, a second machine learning model (i) including the first layer group and a second layer group which is connected to the first layer group and which receives input of the features of the image and classifies the image and (ii) employing the first machine learning model as a pre-trained model; a first calculating means that calculates a first similarity, which is a similarity between (i) a parameter of the first layer group after training by the first training means but before training by the second training means and (ii) a parameter of the first layer group after training by the second training means; and a first determining means that determines, on a basis of the first similarity, whether or not the set of images-for-training includes an inappropriate image-for-training.

Supplementary Note 3

Some or all of the foregoing example embodiments can also be expressed as below.

An image-for-training selecting apparatus including at least one processor, the at least one processor executing: a first training process of training, by contrastive learning, a first machine learning model including a first layer group which receives input of an image and generates features of the image, the contrastive learning using a set of images-for-training, which is a plurality of images-for-training; a second training process of training, with use of the set of images-for-training, a second machine learning model (i) including the first layer group and a second layer group which is connected to the first layer group and which receives input of the features of the image and classifies the image and (ii) employing the first machine learning model as a pre-trained model; a first calculating process of calculating a first similarity, which is a similarity between (i) a parameter of the first layer group after training by the first training means but before training by the second training means and (ii) a parameter of the first layer group after training by the second training means; and a first determining process of determining, on a basis of the first similarity, whether or not the set of images-for-training includes an inappropriate image-for-training.

Note that the image-for-training selecting apparatus may further include a memory. In the memory, a program causing the processor to execute the first training process, the second training process, the first calculating process, and the first determining process may be stored. The program may can be stored in a non-transitory, tangible storage medium capable of being read by a computer.

REFERENCE SIGNS LIST 1, 2, 2A, 3, 3A: image-for-training selecting apparatus
11: first training section
12: second training section
13: first calculating section
14: first determining section
22: selecting section
32: second calculating section
33: second determining section
M1, M2: encoder (feature extraction model)

What is claimed is:

1. An image-for-training selecting apparatus comprising at least one processor, the at least one processor executing:
a first training process of training, by contrastive learning, a first machine learning model including a first layer group which receives input of an image and generates features of the image, the contrastive learning using a set of images-for-training, which is a plurality of images-for-training;
a second training process of training, with use of the set of images-for-training, a second machine learning model (i) including the first layer group and a second layer group which is connected to the first layer group and which receives input of the features of the image and classifies the image and (ii) employing the first machine learning model as a pre-trained model;
a first calculating process of calculating a first similarity, which is a similarity between (i) a parameter of the first layer group after training by the first training process but before training by the second training process and (ii) a parameter of the first layer group after training by the second training process; and
a first determining process of determining, on a basis of the first similarity, whether or not the set of images-for-training includes an inappropriate image-for-training.

2. The image-for-training selecting apparatus according to claim 1, wherein:
the at least one processor further executes:
a selecting process of selecting, as the set of images-for-training, some of a plurality of images-for-training, wherein
in a case where it is determined, in the first determining process, that the set of images-for-training includes an inappropriate image-for-training, a set of images-for-training which is different from the set of images-for-training having been selected is selected, in the selecting process, for optimizing training.

3. The image-for-training selecting apparatus according to claim 1, wherein:
in the first calculating process, the at least one processor calculates second similarities, which are similarities of respective layers of the first layer group included in the first machine learning model.

4. The image-for-training selecting apparatus according to claim 3, wherein:
in the first calculating process, the at least one processor calculates, as the first similarity, a value given by dividing a sum of the second similarities by the number of the layers in the first layer group included in the first machine learning model; and
in a case where the first similarity is less than a threshold, the at least one processor determines, in the first determining process, that the set of images-for-training includes an inappropriate image-for-training.

5. The image-for-training selecting apparatus according to claim 3, wherein:
in the first calculating process, the at least one processor calculates, as the first similarity, a value given by dividing a weighted sum, which is a sum of the second similarities having been given weights, by a sum of values of the weights; and
in a case where the first similarity is less than a threshold, the at least one processor determines, in the first determining process, that the set of images-for-training includes an inappropriate image-for-training.

6. The image-for-training selecting apparatus according to claim 5, wherein:
in the first calculating process, the at least one processor gives a heavier weight value to, among the second similarities of the layers of the first layer group, a second similarity of a layer closer to an output of the first machine learning model.

7. The image-for-training selecting apparatus according to claim 2, wherein:
the at least one processor further executes:
a second calculating process of calculating an index indicating a degree of imbalance in attributes of the plurality of images-for-training included in the set of images-for-training selected in the selecting process; and
a second determining process of determining whether or not the index calculated in the second calculating process is less than a threshold.

8. The image-for-training selecting apparatus according to claim 7, wherein:
in a case where it is determined, in the second determining process, that the index is not less than the threshold, the at least one processor selects, in the selecting process, a set of images-for-training which is different from the set of images-for-training having been selected.

9. An image-for-training selecting method comprising at least one processor carrying out:
training, by contrastive learning, a first machine learning model including a first layer group which receives input of an image and generates features of the image, the contrastive learning using a set of images-for-training, which is a plurality of images-for-training;
training, with use of the set of images-for-training, a second machine learning model (i) including the first layer group and a second layer group which is connected to the first layer group and which receives input of the features of the image and classifies the image and (ii) employing the first machine learning model as a pre-trained model;
calculating a first similarity, which is a similarity between (i) a parameter of the first layer group after training by the contrastive learning but before training of the second machine learning model and (ii) a parameter of the first layer group after training of the second machine learning model; and
determining, on a basis of the first similarity, whether or not the set of images-for-training includes an inappropriate image-for-training.

10. A non-transitory storage medium containing a program for causing a computer to function as an image-for-training selecting apparatus, the program causing the computer to execute:
a first training process of training, by contrastive learning, a first machine learning model including a first layer group which receives input of an image and generates features of the image, the contrastive learning using a set of images-for-training, which is a plurality of images-for-training;
a second training process of training, with use of the set of images-for-training, a second machine learning model (i) including the first layer group and a second layer group which is connected to the first layer group and which generates input of the features of the image and classifies the image and (ii) employing the first machine learning model as a pre-trained model;
a first calculating process of calculating a first similarity, which is a similarity between (i) a parameter of the first layer group after training by the first training process but before training by the second training process and (ii) a parameter of the first layer group after training by the second training process; and
a first determining process of determining, on a basis of the first similarity, whether or not the set of images-for-training includes an inappropriate image-for-training.

\* \* \* \* \*